United States Patent [19]

Beebe

[11] Patent Number: 5,047,381

[45] Date of Patent: Sep. 10, 1991

[54] LAMINATED SUBSTRATE FOR CATALYTIC COMBUSTOR REACTOR BED

[75] Inventor: Kenneth W. Beebe, Galway, N.Y.

[73] Assignee: General Electric Company, Schenectady, N.Y.

[21] Appl. No.: 273,537

[22] Filed: Nov. 21, 1988

[51] Int. Cl.$^5$ .................. B01J 21/04; B01J 21/06; B01J 23/12; B01J 23/40

[52] U.S. Cl. .................... 502/304; 502/303; 502/308; 502/313; 502/325; 502/326; 502/327; 502/328; 502/331; 502/332; 502/333; 502/334; 423/213.5

[58] Field of Search .............. 502/325, 339, 338, 303, 502/302, 304, 340, 346, 527, 308, 313, 326, 327, 328, 331, 332, 333, 334; 423/213.5

[56] References Cited

U.S. PATENT DOCUMENTS

| | | | |
|---|---|---|---|
| Re. 29,488 | 12/1977 | Gautreaux | 44/68 |
| 3,867,313 | 2/1975 | Brewer | 252/465 |
| 3,873,472 | 3/1975 | Oshima et al. | 502/327 |
| 3,925,570 | 12/1975 | Reinke et al. | 117/21 |
| 3,958,955 | 5/1976 | Gautreaux | 44/68 |
| 4,172,047 | 10/1979 | Gandhi et al. | 423/213.5 |
| 4,247,422 | 1/1981 | Davies | 423/213.5 |
| 4,285,908 | 8/1981 | Thompson et al. | 422/143 |
| 4,289,652 | 9/1981 | Hunter et al. | 252/437 |
| 4,313,806 | 2/1982 | Dalton, Jr. et al. | 204/147 |
| 4,340,013 | 7/1982 | Lindstrom | 123/3 |
| 4,397,770 | 8/1983 | Cairns et al. | 502/316 |
| 4,426,319 | 1/1984 | Blanchard et al. | 502/241 |
| 4,438,219 | 3/1984 | Blandenburg et al. | 502/333 |
| 4,572,904 | 2/1986 | Onal | 502/333 |
| 4,603,547 | 8/1986 | Pfefferle et al. | 60/39.02 |
| 4,673,663 | 6/1987 | Magnier | 502/320 |
| 4,831,009 | 5/1989 | Retallick | 502/334 |
| 4,857,499 | 8/1989 | Ito et al. | 502/326 |
| 4,868,148 | 9/1989 | Henk et al. | 502/326 X |

FOREIGN PATENT DOCUMENTS

| | | |
|---|---|---|
| 0111610 | 6/1984 | European Pat. Off. . |
| 3809226 | 9/1988 | Fed. Rep. of Germany . |
| WO86/04264 | 7/1986 | PCT Int'l Appl. . |
| 832031 | 4/1960 | United Kingdom . |

OTHER PUBLICATIONS

*CRC Handbook of Chemistry and Physics*, Weast et al, 61st Ed., 1980, p. 30.
Catalytic Combustion Applied to Gas Turbine Technology, Enga et al, pp. 134–141, 1985.

Primary Examiner—W. J. Shine
Attorney, Agent, or Firm—Nixon & Vanderhye

[57] ABSTRACT

A laminated oxidation resistant catalyst element includes a metal alloy substrate such as a steel foil coated with a noble metal such as platinum. A ceramic washcoat such as alumina is applied over the noble metal and a catalyst is applied with the washcoat or individually during a subsequent application step. The noble metal prevents oxygen from contacting the metal substrate thereby preventing its degradation by oxidation reactions. The catalyst element is particularly suited for use in a catalytic reactor bed of an industrial gas turbine.

10 Claims, 1 Drawing Sheet

LAMINATED SUBSTRATE FOR CATALYTIC COMBUSTOR REACTOR BED

BACKGROUND OF THE INVENTION

This invention relates generally to combustion catalysts and particularly relates to an oxidation resistant laminated composite metal substrate including a protective noble metal coating upon which a combustion catalyst is supported.

DESCRIPTION OF PRIOR DEVELOPMENTS

In an attempt to reduce or eliminate undesirable emissions from industrial gas turbine engines, turbine manufacturers have turned to catalytic combustion techniques wherein a combustion catalyst is used to promote flameless combustion in the turbine combustor reaction zone. The primary emissions usually produced by gas turbine engines burning conventional fuels are oxides of nitrogen, carbon monoxide and unburned hydrocarbons. The use of a combustion catalyst in the reaction zone of a gas turbine combustion system promotes complete combustion of lean premixed fuel and air and thereby minimizes such undesirable emissions.

Unfortunately, the operating environment in a gas turbine combustor reaction zone is hostile to catalytic reactors and typically causes their premature failure. This failure poses a significant problem in that industrial gas turbines are required to remain functional for long periods of operation. Thus, up to the development of the present invention, catalytic combustion in gas turbine engines has not proved entirely successful.

Catalytic reactor beds having ceramic supports or substrates are particularly prone to early failure when operated in a gas turbine combustor reaction zone. The cearmic substrates typically crack and subsequently disintegrate due to the thermal and mechanical shock from the hot exhaust gasses as well as the vibration present in this region of the turbine engine.

Although the use of catalytic reactor beds having metal supports or substrates has been attempted with some success, these reactor beds are prone to disintegration caused by high temperature oxidation of the metal substrate. Metal substrate catalytic reactor beds also have failed due to high temperature melting of the metal substrate.

Conventional metal substrate catalytic reactor beds designed for use in high temperature environments are currently produced by applying a ceramic washcoat and catalyst directly to the surface of a high temperature metal alloy foil which has been preformed into a honeycomb support structure. One design incorporates a steel alloy as a support substrate over which a platinum catalyst is applied. When exposed to high temperature operation in an oxidizing environment, this design is subject to the high temperature oxidation and melting problems noted above.

Accordingly, a need exists for a metal substrate catalytic reactor bed capable of prolonged high temperature operation in an oxidizing atmosphere. A further need exists for a high melting temperature metal foil catalytic reactor bed substrate which resists oxidation and subsequent loss of structural integrity while operating in a combustor reaction zone of a gas turbine or other high temperature oxidizing environment.

SUMMARY OF THE INVENTION

The present invention has been developed to fulfill the needs noted above and therefore has as a primary object the provision of a metal substrate catalytic reactor bed capable of withstanding operating temperatures higher than those previously possible with conventional designs. Another object is the provision of a metal substrate catalytic reactor bed suitable for prolonged use in the reaction zone of a high efficiency gas turbine combustion system or similar environment.

These objects are met by applying a protective coating to a metal foil substrate to inhibit oxidation and subsequent degradation of the structural integrity of the metal foil substrate. The protective coating is preferably a noble metal coating which is applied between a ceramic washcoat with a metal catalyst and a high melting temperature metal foil. The foil provides the structural support for the catalytic reactor bed while the noble metal coating prevents oxygen in the surrounding atmosphere from contacting and oxidizing the metal foil. A catalytic reactor bed manufactured with such a coated metal foil is particularly suited for use in a catalytic combustion reactor bed in an industrial gas turbine.

The aforementioned objects, features and advantages of the invention will, in part, be pointed out with particularity, and will, in part, become obvious from the following more detailed description of the invention, taken in conjunction with the accompanying drawing, which form an integral part thereof.

DESCRIPTION OF THE PREFERRED EMBODIMENT

Figure 1:
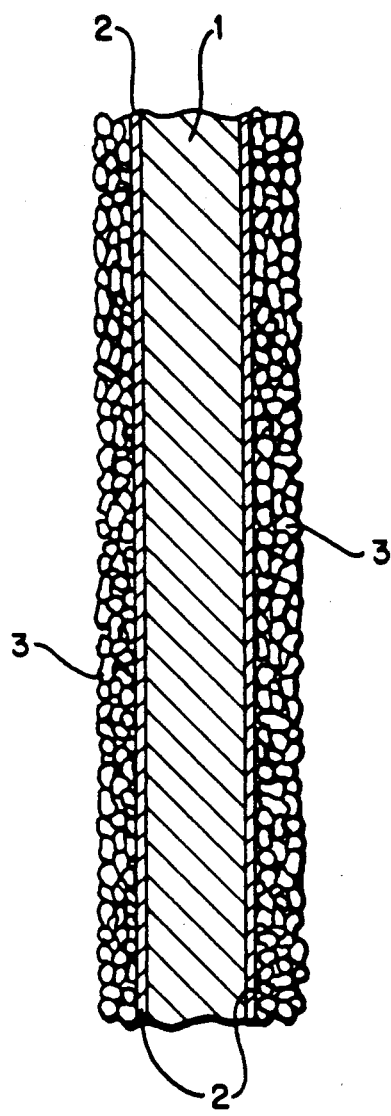
FIG. 1 is a fragmental sectional view through a metal substrate catalytic combustion laminate produced according to the invention.

The application of a protective noble metal coating to the surface of a high melting temperature metal foil substrate is illustrated in FIG. 1. The catalytic reactor bed or catalyst element includes a high melting temperature metal foil substrate 1, formed of any high temperature alloy such as used for furnace elements or high temperature coatings. For example, alloys which combine aluminum, chromium and iron such as Kanthal ®, or those which combine nickel and chromium, or nickel, chromium, and iron such as Nichrome may be used to form the metal foil substrate 1.

Other alloys which include a combination of iron, chromium, aluminum and yttrium or nickel, chromium, aluminum and yttrium or cobalt, chromium, aluminum and yttrium are also suitable for forming the metal foil substrate. A preferred alloy for forming the metal foil substrate is Fecralloy ® steel which has as a typical composition: carbon 0.03%, silicon 0.30%, chromium 15.80%, aluminum 4.80%, yttrium 0.30% with the balance being iron. The metal foil substrate 1 may be formed with any desired thickness as required for structural support. For example, it is acceptable to form the metal foil as a thin sheet having a thickness of about ).006 inch.

A layer of a noble metal 2 is applied to the metal foil substrate 1 in the form of a protective coating to minimize the oxidation of the metal foil substrate. The metal foil substrate 1 should be coated with the noble metal 2 on all surfaces which may be exposed to a high temperature oxidizing atmosphere. The noble metal 2 may be formed of platinum, palladium, rhodium, iridium, osmium, ruthenium or combinations (compounds) thereof. Initially, the noble metal 2 may take the form of a dissolved salt or fine powder, depending upon the process used to apply the coating. Standard plasma spray, electroplating or vapor deposition processes and apparatus may be used to apply the noble metal 2 as a thin continuous coating to the metal foil substrate. An acceptable coating thickness for the noble metal 2 is about 0.0001 inch, or less.

A ceramic washcoat and catalyst layer 3 is applied to the surface of the noble metal 2 by dipping the metal foil substrate 1 coated with the noble metal 2 in a washcoat and catalyst slurry wherein the catalyst and washcoat are mixed together. The washcoat and catalyst layer 3 may also be formed by first applying the washcoat by dipping the coated substrate in a washcoat slurry and then later applying a catalyst to the washcoat as a plasma spray. Thus, the washcoat and catalyst may be applied individually, i.e. sequentially, or in combination as a thin coating.

The washcoat material is typically alumina which provides a thermally stable metal oxide coating having an adequate BET surface area. Ceria or cesium oxide may be used as a washcoat stabilizer. In addition to alumina, zirconia and thoria may also be used as washcoat materials. An acceptable thickness for the combined washcoat and catalyst layer 3 may be, for example, about 0.0006 inches.

The catalyst applied with or to the washcoat to form the washcoat and catalyst layer 3 may be selected from the following materials: platinum, palladium, rhodium, iridium, chromium oxides, iron oxides, cobalt oxides, lanthanum oxides, terbium - cerium thorium, ruthenium, osmium, nickel oxides, magnesium oxides and copper oxides. After application of the ceramic washcoat and catalyst layer 3, a reactor bed formed of the resulting laminate may be oven fired. However, no heat treatment of the nobel metal 2 is required.

The ceramic washcoat impedes the flow of oxygen to the surface of the coating of noble metal 2 and thereby slows the rate of oxidation of the noble metal. However, the ceramic washcoat is not impervious to oxygen so it must rely upon its own inherent resistance to oxidation to maintain its structural integrity. Although the ceramic washcoat and catalyst layer 3 does not offer significant high temperature protection (thermal insulation) to the metal foil substrate 1 and noble metal coating 2, it does protect the noble metal coating 2 from hot gas erosion.

The operating temperature of a combustion catalyst formed according to the invention may range from about 1800° F. to about 2500° F. Although the noble metal coating will impede the oxidation of the metal foil substrate 1 and thereby increase its operating life at a given exposure temperature, oxidation of the metal foil substrate is a function of time and temperature. Therefore, an exact value for the service life of the catalyst element is not readily available, although a service life of 8,000 hours is believed possible. The melting points for one combination of materials for manufacturing a laminated catalyst element according to the invention are as follows:

| Fecralloy ® steel foil | 1375°-1550° C. |
|---|---|
| Platinum coating | 1773° C. |

-continued

| Alumina washcoat | 1865°-2032° C. |
|---|---|
| Palladium catalyst | 1554° C. |

It can be appreciated that the high melting temperature metal foil 1 provides the structural support required for the reactor bed fabrications manufactured from the basic catalyst lamination depicted in FIG. 1. The noble metal coating 2 protects the metal foil 1 from oxidation and simultaneously promotes chemical reactions due to its catalytic activity. The washcoat and catalyst layer 3 provides a large surface area to further promote chemical reactions due to its catalytic activity.

The laminated catalyst element produced as set forth above may be formed into a honeycomb structured catalyst reaction bed to minimize flow resistance and maximize surface area for reactants passing through the bed. The bed thus formed is suitable for operation in a high temperature oxidizing environment such as the reaction zone of a high efficiency gas turbine combustor. It is particularly suited for minimizing exhaust emissions in heavy duty industrial gas turbines.

A catalytic reactor bed or catalyst element fabricated according to the invention will provide increased service life over prior designs. The addition of the coating of noble metal 2 between the metal foil substrate 1 and the washcoat and catalyst layer 3 not only protects the substrate from oxidation and promotes chemical reactions, but also serves as a catalyst reserve or catalyst supplement to the catalyst added to the washcoat. For example, in the event the washcoat catalyst is lost at some point in the service life of the reactor bed, the coating of noble metal 2 will itself act as a catalyst in addition to an oxidation resistant protective coating.

There has been disclosed heretofore the best embodiment of the invention presently contemplated. However, it is to be understood that various changes and modifications may be made thereto without departing from the spirit of the invention.

I claim:

1. A laminated catalyst element, comprising:
   a metal support substrate;
   a catalytically active noble metal oxidation resistant layer selected from the group consisting of plantinum, palladium, rhodium, iridium, osmium and ruthenium, provided over said metal support substrate for preventing high temperature oxidation of said metal support substrate;
   a metal oxide coating, selected from the group consisting of alumina, zirconia and thoria, provided over said noble metal oxidation resistant layer; and
   a combustion catalyst selected from the group consisting of platinum, palladium, rhodium, iridium, chromium oxides, iron oxides, cobalt oxides, lanthanum oxides, terbium-cerium-thorium, ruthenium, osmium, nickel oxides, magnesium oxides and copper oxides, said combustion catalyst being provided on said metal oxide coating, and wherein said noble metal oxidation resistant layer provides a secondary source of combustion catalyst due to said catalytic activity thereof.

2. The catalyst element of claim 1, wherein said metal support substrate comprises a steel alloy.

3. The catalyst element of claim 1, wherein said metal support substrate comprises a metal foil.

4. A catalyst element comprising:
   a metal support substrate;

a catalytically active noble metal oxidation resistant layer selected from the group consisting of platinum, palladium, rhodium, iridium, osmium and ruthenium, provided over said metal support substrate for preventing high temperature oxidation of said metal support substrate; and a washcoat covering the noble metal oxidation resistant layer, wherein said washcoat includes:
  (i) a metal oxide selected from the group consisting of alumina, zirconia and thoria; and
  (ii) a combustion catalyst selected from the group consisting of platinum, palladium, rhodium, iridium, chromium oxides, iron oxides, cobalt oxides, lanthanum oxides, terbium-cerium-thorium, ruthenium, osmium, nickel oxides, magnesium oxides and copper oxides, and wherein said noble metal oxidation resistant layer provides a secondary source of combustion catalyst due to said catalytic activity thereof.

5. The catalyst element of claim 1, wherein said oxidation resistant layer comprises a continuous coating having a thickness of 0.0001 inch or less.

6. The catalyst layer of claim 1, wherein said oxidation resistant layer is applied to said metal support substrate as a plasma spray.

7. A catalytic combustor capable of prolonged high temperature operation in an oxidizing atmosphere including at least one laminated catalyst element, wherein said catalyst element comprises:

a metal foil support having at least one surface exposed to said oxidizing atmosphere;

an oxidation-resistant layer consisting essentially of a continuous coating of a catalytically active noble metal selected from platinum, palladium, rhodium, iridium, osmium and ruthenium, applied over said at least one surface and providing means for inhibiting oxidation and subsequent degradation of said metal foil support by virtue of exposure of said at least one surface of said oxidizing atmosphere; and a ceramic washcoat and catalyst layer provided over said oxidation-resistant layer, wherein said ceramic washcoat is selected from the group consisting of alumina, zirconia and thoria, and said oxidation-resistant layer supplements said catalyst in said ceramic washcoat and catalyst layer due to the catalytic activity of said continuous coating of said noble metal.

8. A catalytic combustor as in claim 7, wherein said ceramic washcoat includes a stabilizer selected from ceria or cesium oxide.

9. A catalytic combustor as in claim 7, wherein said oxidation-resistant layer has a thickness of 0.0001 inch or less.

10. A catalytic combustor as in claim 9, wherein said ceramic washcoat and catalyst layer has a thickness of about 0.0006 inch.

* * * * *